(12) United States Patent
Elie-Dit-Cosaque et al.

(10) Patent No.: US 7,512,141 B2
(45) Date of Patent: Mar. 31, 2009

(54) DOMAIN CONFIGURATION IN AN ETHERNET OAM NETWORK HAVING MULTIPLE LEVELS

(75) Inventors: David Elie-Dit-Cosaque, Richardson, TX (US); Kamakshi Sridhar, Plano, TX (US); Maarten Petrus Joseph Vissers, Huizen (NL); Tony Van Kerckhove, Antwerp (BE)

(73) Assignee: Alcatel Lucent, Paris (FR)

( * ) Notice: Subject to any disclaimer, the term of this patent is extended or adjusted under 35 U.S.C. 154(b) by 834 days.

(21) Appl. No.: 11/023,716

(22) Filed: Dec. 28, 2004

(65) Prior Publication Data
US 2006/0007867 A1 Jan. 12, 2006

Related U.S. Application Data

(60) Provisional application No. 60/586,248, filed on Jul. 8, 2004.

(51) Int. Cl.
*H04L 12/28* (2006.01)
*H04J 3/26* (2006.01)
*G06F 15/177* (2006.01)

(52) U.S. Cl. ............... 370/408; 370/241.1; 370/254; 370/392; 370/401; 370/432; 709/220; 709/221

(58) Field of Classification Search ......... 370/216–245, 370/254, 392, 395.3, 400, 449, 462, 408, 370/432; 709/223–249
See application file for complete search history.

(56) References Cited

U.S. PATENT DOCUMENTS

| | | | |
|---|---|---|---|
| 6,515,969 B1 * | 2/2003 | Smith ..................... | 370/256 |
| 6,785,294 B1 * | 8/2004 | Ammitzbøll et al. ........ | 370/467 |
| 6,937,576 B1 * | 8/2005 | Di Benedetto et al. ...... | 370/256 |
| 7,043,541 B1 * | 5/2006 | Bechtolsheim et al. ...... | 709/223 |
| 7,143,153 B1 * | 11/2006 | Black et al. ................ | 709/223 |
| 7,225,224 B2 * | 5/2007 | Nakamura .................. | 709/204 |
| 7,286,538 B2 * | 10/2007 | Song et al. .................. | 370/392 |
| 2003/0103522 A1 * | 6/2003 | Hane .......................... | 370/462 |
| 2004/0032868 A1 * | 2/2004 | Oda et al. .................... | 370/389 |

(Continued)

OTHER PUBLICATIONS

Elie-Dit-Cosaque D., Vissers M., "Review of 802.lag framework", IEEE, Online! Mar. 12, 2004, XP002346927. www.ieee802.org. Retrieved from the Internet: URL:http://www.ieee802.org/1/files/public/docs2004/Review%20of%20802.lag%20framework 1.pdf. Retrieved Sep. 26, 2006.

(Continued)

*Primary Examiner*—Edan Orgad
*Assistant Examiner*—Venkatesh Haliyur

(57) ABSTRACT

A domain configuration system and method operable in an Ethernet OAM network having multiple levels of OAM domains. A port of a first end bridge of the network is configured as a first MEP node belonging to a predetermined OAM domain having a particular level. GARP or CC frames are transmitted from the first MEP node in a forward attribute registration process towards the remaining bridges of the network. A port of a second end bridge of the network is configured as a second MEP node of the predetermined OAM domain. In a backward attribute registration process, GARP or CC frames are transmitted from the second MEP node towards the remaining bridges of the network. Responsive to the frame flow, ports in bridges disposed between the first and second end bridges are automatically configured as MIP nodes having the particular level.

50 Claims, 13 Drawing Sheets

U.S. PATENT DOCUMENTS

| | | | |
|---|---|---|---|
| 2004/0114924 A1* | 6/2004 | Holness et al. ................. | 398/33 |
| 2004/0160895 A1* | 8/2004 | Holmgren et al. ........... | 370/223 |
| 2004/0165595 A1* | 8/2004 | Holmgren et al. ........ | 370/395.3 |
| 2005/0080912 A1* | 4/2005 | Finn ........................... | 709/230 |
| 2005/0099954 A1* | 5/2005 | Mohan et al. ............ | 370/241.1 |
| 2005/0100026 A1* | 5/2005 | Mancour .................... | 370/400 |
| 2006/0056414 A1* | 3/2006 | Elie-Dit-Cosaque et al. ..... | 370/392 |

OTHER PUBLICATIONS

Dinesh M: "802.1AG Connectivity Fault Management Tutorial" IEEE 802 Plenary Tutorials, 'Online! Jul. 12, 2004, XP002346928. Retrieved from the Internet: URL: http://grouper.ieee.org/groups/802/802_tutorials/july04/802.1ag%20-%20CFM%20Tutorial%20-%20Part%201%20v2.ppt. Retrieved on Sep. 26, 2005.

Sridhar K. Elie-Dit-Cosaque D., Vissers M.: "End-to-End Ethernet Connectivity Fault Management in Metro and Access Networks" Technology White Paper, 'Online! Jun. 30, 2005, XP002346929. Alcatel Web Page. Retrieved from the Internet: URL: http://www.alcatel.com/com/en/appcontent/apl/T0605-CFM-EN_tcm172-288401634.pdf. Retrieved on Sep. 23, 2005.

Seaman M: "Maintenance Point Architecture" IEEE, 'Online! May 7, 2005, XP002346930. www.ieee802.org. Retrieved from the Internet: URL: http://www.ieee802.org/1/files/public/docs2005/ag-seaman-maintenance-point-arch-0505-01.pdf. Retrieved on Sep. 26, 2005.

U.S. Appl. No. 11/023,784, filed Dec. 28, 2004, Alarm Indication And Suppression (AIS) Mechanism In An Ethernet OAM Network.

U.S. Appl. No. 11/020,898, filed Dec. 22, 2004, Autoconfiguration Of Ethernet OAM Points.

Squire; "Metro Ethernet Forum OAM"; Metro Ethernet Forum; pp. 1-25.

"Making Universal Broadband Access A Reality"; Ethernet in the First Mile Alliance (EFMA); http://www.efmalliance.org/whitepaper.html; pp. 1-14.

"Bringing Carrier-Class Management to Ethernet in the First Mile"; Metrobility Optical Systems; pp. 1-8.

"Service delivery technologies for Metro Ethernet Networks"; Nortel Networks; pp. 1-10.

"Layer 2 Protocol Conformance Testing for Ethernet switches"; Net-O2 Technologies; pp. 1-16.

"GARP: Generic Attribute Registration Protocol"; Protocol Dictionary; 2 pages; http://www.javvin.com/protocolGARP.html.

Finn; "Metro Ethernet Connection Management"; IEEE Interim meeting; Jan. 2004; pp. 1-77.

Iwamura; "OAM Flow of Ethernet OAM"; International Telecommunication Union; Feb. 2004; pp. 1-9.

Mohan; "Ethernet OAM Update Overview & Technical Aspects"; Nortel Networks; May 18, 2004; 17 pages.

* cited by examiner

US 7,512,141 B2

DOMAIN CONFIGURATION IN AN ETHERNET OAM NETWORK HAVING MULTIPLE LEVELS

PRIORITY UNDER 35 U.S.C. §119(e) & 37 C.F.R. §1.78

This nonprovisional application claims priority based upon the following prior United States provisional patent application(s): (i) "OAM DOMAIN CONFIGURATION USING GARP (GENERIC OAM REGISTRATION PROTOCOL—GORP)," Application No.: 60/586,248, filed Jul. 8, 2004, in the name(s) of: David Elie-Dit-Cosaque, Kamakshi Sridhar, Maarten Petrus Joseph Vissers and Tony Van Kerckhove; each of which is hereby incorporated by reference.

INCORPORATION BY REFERENCE OF RELATED APPLICATION

This application discloses subject matter related to the subject matter disclosed in the following commonly owned co-pending patent application(s): (i) "Alarm Indication And Suppression (AIS) Mechanism in an Ethernet OAM Network," application Ser. No.: 11/023,784, filed Dec. 28, 2004, in the name(s) of: David Elie-Dit-Cosaque, Kamakshi Sridhar, Maarten Petrus Joseph Vissers and Tony Van Kerckhove; and ii) "Autoconfiguration of Ethernet OAM Points," application Ser. No. 11/020,898, filed Dec. 22, 2004, in the name(s) of: David Elie-Dit-Cosaque, Kamakshi Sridhar, Maarten Vissers and Tony Van Kerckhove; which are hereby incorporated by reference.

BACKGROUND OF THE INVENTION

1. Technical Field of the Invention

The present invention generally relates to Ethernet OAM networks. More particularly, and not by way of any limitation, the present invention is directed to a system and method for configuring OAM domains in an Ethernet OAM network having multiple levels.

2. Description of Related Art

In order to adapt the well known Ethernet technology in a carrier-grade service environment, various standards are being developed that aim to provide advanced operations, administration and maintenance (OAM) capabilities (also referred to as Ethernet Connectivity and Fault Management or Ethernet CFM) across the entire network from one end to the other end. Since the end-to-end service network environment is typically comprised of a patchwork of diverse component networks (e.g., metro access networks and core networks using a variety of technologies) that may belong to different organizations, network operators and service providers, the Ethernet OAM plane is envisioned as a hierarchically layered domain space wherein specific OAM domains are defined corresponding to the constituent network infrastructure and provisioning. In particular, two standards, IEEE 802.1ag and ITU-T (Question 3, Study Group 13), incorporated by reference herein, that are specifically concerned with end-to-end Ethernet OAM define a customer-level domain at the highest level of hierarchy, which comprises one or more provider domains (occupying an intermediate level), each of which in turn includes one or more operator domains disposed at a lower hierarchical level. By way of standardization, the OAM domain space may be partitioned into up to a number of levels, e.g., 8 levels, each domain corresponding to a particular level, wherein a domain is defined in terms of what are referred to as flow points. In the context of the IEEE 802 specification suite, the flow points are new entities contained in Media Access Control (MAC) "interfaces" and "ports" as defined in related standards documentation. A flow point at the edge of an OAM domain is called a "Maintenance End Point" or MEP. A flow point inside a domain and visible to a MEP is called a "Maintenance Intermediate Point" or MIP. Whereas MEP nodes are used by system administrators to initiate and monitor OAM activity (by issuing appropriate OAM frames), MIP nodes passively receive and respond to OAM flows initiated by MEP nodes. An OAM domain having one or more MIP nodes is bounded by two or more MEP nodes, wherein a "Maintenance Entity" (ME) is defined to include a set of MIP nodes disposed between one MEP node and another MEP node. Thus it is possible to have more than one ME in a particular OAM domain.

In order that OAM frame flows are appropriately filtered so that they are processed only by the intended domain's nodes, the MEP/MIP population of an Ethernet OAM network needs to be properly configured. In accordance with the current standards, absolute OAM level encoding uses an integer value to indicate a specific domain level. Moreover, each MIP node at a given layer must be manually configured with its domain level in order to support proper OAM operation. Manual configuration can however be time-consuming as well as error-prone, particularly in a network with many levels and a large number of MIP nodes. If the MIP nodes are misconfigured for any reason with the wrong domain level, or if a MEP node is malfunctioning, security violations are possible due to leakage of OAM frames between domains.

SUMMARY OF THE INVENTION

In one aspect, a domain configuration system and method is disclosed for an Ethernet OAM network having multiple levels of OAM domains. A port of a first end bridge of the network is configured as a first MEP node belonging to a predetermined OAM domain having a particular level. GARP or CC frames are transmitted from the first MEP node in a forward attribute registration process towards the remaining bridges of the network. A port of a second end bridge of the network is configured as a second MEP node of the predetermined OAM domain. In a backward attribute registration process, GARP or CC frames are transmitted from the second MEP node towards the remaining bridges of the network. Responsive to the frame flow, ports in bridges disposed between the first and second end bridges are automatically configured as MIP nodes having the particular level.

In another aspect, the present invention is directed to a network bridge entity operable in an Ethernet network having multiple levels of OAM domains. Included with the bridge is means for configuring a port associated therewith as a MEP node belonging to a predetermined OAM domain having a particular level. Also included is means for generating a set of GARP or CC frames for transmission in an attribute registration process from the port towards remaining ports of the network bridge entity. Where the GARP frames are used, the OAM level information is provided as an attribute value. If the CC frames are used, alternatively, the level information relating to the particular level is included in an OAM level field therein.

BRIEF DESCRIPTION OF THE DRAWINGS

The accompanying drawings are incorporated into and form a part of the specification to illustrate one or more presently preferred exemplary embodiments of the present invention. Various advantages and features of the invention will be understood from the following Detailed Description taken in connection with the appended claims and with reference to the attached drawing figures in which:

DETAILED DESCRIPTION OF THE DRAWINGS

Figure 1:
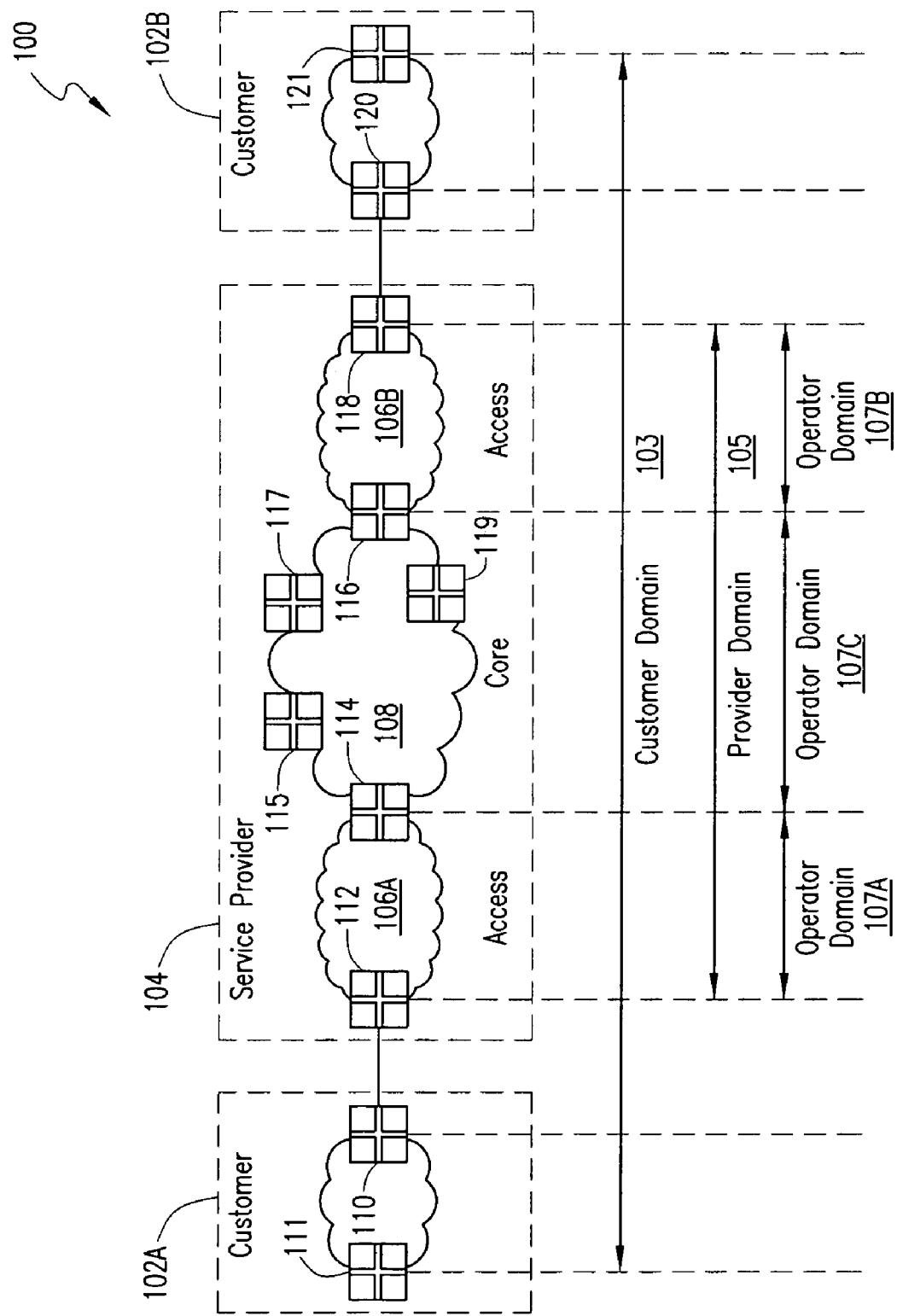
FIG. 1 depicts an embodiment of an end-to-end Ethernet OAM network having a plurality of OAM domains.

Embodiments of the invention will now be described with reference to various examples of how the invention can best be made and used. Like reference numerals are used throughout the description and several views of the drawings to indicate like or corresponding parts, wherein the various elements are not necessarily drawn to scale. Referring now to the drawings, and more particularly to FIG. 1, depicted therein is an embodiment of an end-to-end Ethernet OAM network 100 having a plurality of OAM domains wherein a domain configuration scheme may be provided in accordance with an aspect of the present invention. As illustrated, the Ethernet OAM network 100 is comprised of a hierarchically layered network environment including a first customer premises network 102A and a second customer premises network 102B that form the terminal portions thereof, which in turn are connected by means of respective access networks 106A and 106B to a core transport network 108. Whereas a single service provider may administer the provisioning of end-to-end service between the two customers, one or more operators may in fact be involved in providing and maintaining the underlying network infrastructure. Accordingly, the access and core networks may comprise various diverse network and transport technologies and protocols for effectuating an end-to-end carrier-grade Ethernet service between the terminal customer networks 102A and 102B. For example, these assorted technologies may include Ethernet over SONET/SDH, Ethernet over ATM, Ethernet over Resilient Packet Ring (RPR), Ethernet over Multiprotocol Label Switching (MPLS), Ethernet over Internet Protocol (IP), etcetera.

The various network portions of the Ethernet OAM network 100 and their constituent segments are interconnected using appropriate forwarding entities such as bridges and switches. By way of illustration, entities 111, 110 and 120, 121 are exemplary of customer equipment disposed in the respective customer networks 102A and 102B. Likewise, entities 112 and 118 of access networks 106A and 106B are operable to interface with the respective customer equipment 110 and 120. Interfacing between the access networks 106A, 106B and the core network 108 is effectuated by means of entities 114 and 116, respectively. In addition to the interfacing entities, a particular network may include a number of additional entities within that network. For example, entities 115, 117 and 119 are exemplary equipment within the core network 108, wherein point-to-multipoint operations may be effectuated.

As alluded to in the Background section of the present patent application, the Ethernet OAM architecture of a hierarchically layered end-to-end carrier-grade Ethernet service network such as the Ethernet network 100 is logically segmented into a number of OAM domains having a designated hierarchy of domain levels. With respect to the Ethernet OAM network 100 of FIG. 1, a customer domain 103, a provider domain 105 and one or more operator domains 107A-107C are exemplified, each of which is bounded by multiple MEP nodes and includes one or more MIP nodes disposed therebetween. Whereas MEP nodes are operable to initiate various OAM commands and associated frames, e.g., Continuity Check (CC), TraceRoute, Ping, etcetera, MIP nodes passively receive and respond to the incoming OAM frames based on domain-level compatibility.

It should be appreciated by those skilled in the art that by virtue of MEP and MIP provisioning, a static partitioning of the Ethernet OAM network is effectuated whereby MEP nodes demarcate the boundaries of nonintersecting Ethernet domains such that OAM frame leakage from one domain to another is curtailed. That is, OAM frames intended for one domain are required to stay within that domain for processing while all other OAM frames are filtered out. Further, MEP and MIP nodes are provisionable within an Ethernet OAM network such that it is possible to define a number of easily manageable Maintenance Entity (ME) domains depending on business and service models and deployment scenarios. Due to the hierarchical arrangement of the OAM domains, customer-level domains are disposed at a higher hierarchical level than the service provider domains, which in turn are disposed at a higher level than operator-level domains. Accordingly, in terms of visibility and awareness, operator-level domains have higher OAM visibility than service provider-level domains, which in turn have higher visibility than customer-level domains. Thus, whereas an operator OAM domain has knowledge of both service provider and customer domains, the converse is not true. Likewise, a service provider domain has knowledge of customer domains but not vice versa.

As set forth in the IEEE 802.1ag specification documentation referenced hereinabove, various rules govern the treatment of Ethernet packets/frames as they move from one domain level to another. MEP nodes are operable to issue OAM frames to all other MEP nodes across the level/OAM domains, while a MIP node can interact only with the MEP nodes of its domain. Each MIP node at a higher domain level is also operable as a MEP node for the next hierarchical layer below. Thus a single piece of forwarding entity equipment (e.g., a bridge) may have both MIP and MEP nodes thereat that are of different levels. Because of the boundedness of OAM flows, frames at a given level i, i=1, 2, . . . , N, remain at that level. The levels of OAM frames are encoded therein depending on the domain levels assigned to the MEP nodes originating the OAM frames. Further, OAM frames are either processed or discarded by the same level MIP/MEP nodes subject to the following conditions: (i) an OAM frame is discarded when originated from outside the instant OAM domain, and (ii) an OAM frame is processed when originated within the instant OAM domain. Due to the hierarchical nature of OAM visibility, frames from lower maintenance domain levels (e.g., operator) are relayed transparently by MEP/MIP nodes disposed at higher domain levels (e.g., customer). On the other hand, higher domain OAM frames (e.g., originated by customer-level MEP nodes) are always processed by lower level MEP/MIP nodes (e.g., operator-level nodes).

Figure 2:
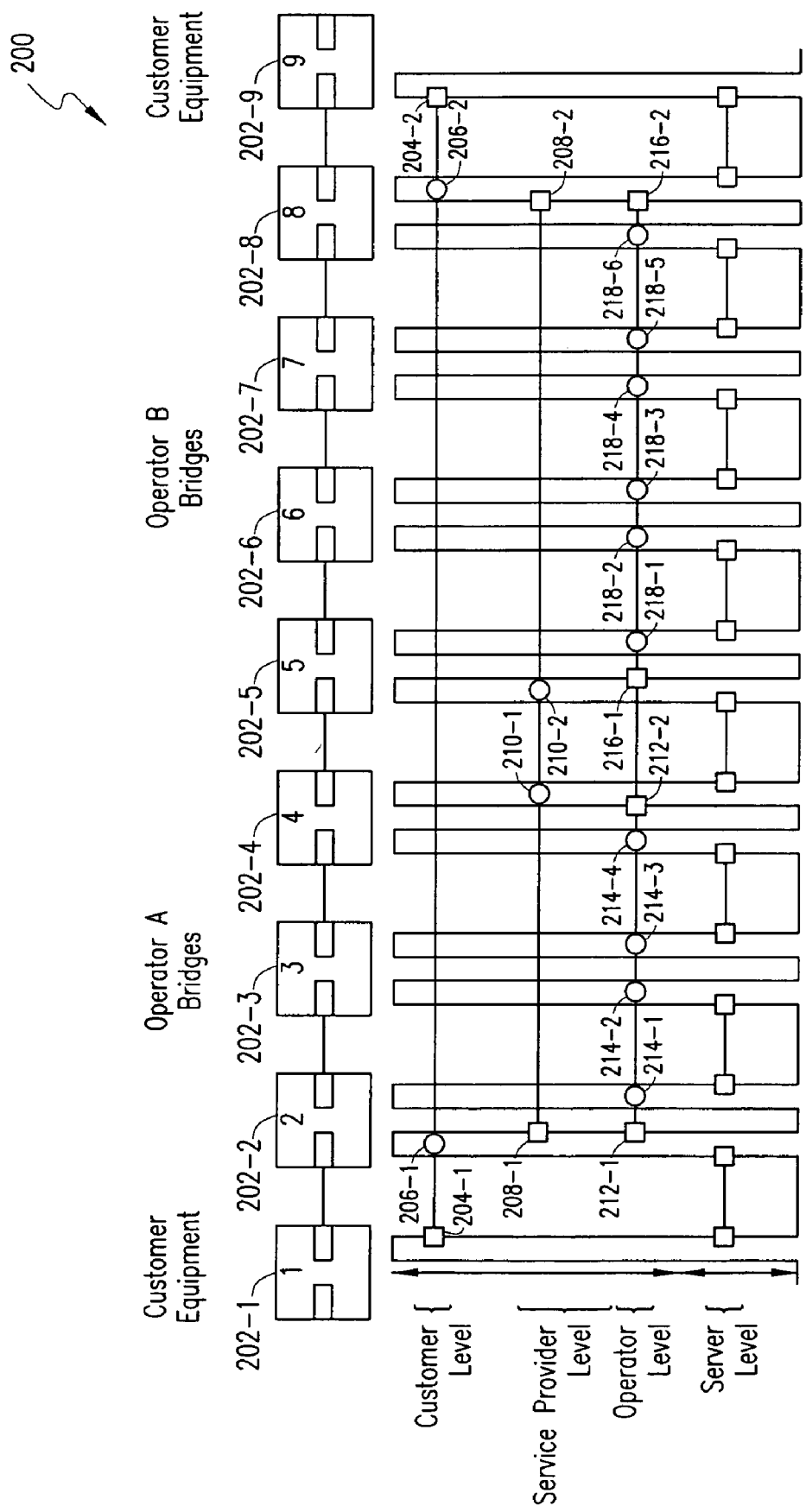
FIG. 2 depicts an exemplary hierarchical OAM layering scheme operable with respect to an end-to-end Ethernet network.

FIG. 2 depicts an exemplary hierarchical OAM layering scheme 200 operable with respect to an end-to-end Ethernet network such as e.g., network 100 shown in FIG. 1, wherein a plurality of Ethernet bridges are illustrative of forwarding entities having MIP/MEP nodes at different domain levels. Reference numerals 202-1 and 202-9 refer to customer bridge equipment disposed at the two ends of the network. Two operator networks, Operator-A and Operator-B, are deployed between the customer equipment 202-1 and 202-9, wherein Operator-A network comprises bridges 202-2. through 202-4 and Operator-B network comprises bridges 202-5 through 202-9. At customer level, the OAM domain is bounded by MEP nodes 204-1 and 204-2 effectuated at customer bridge equipment 202-1 and 202-9, respectively, which includes two MIP nodes 206-1 and 206-2 that are effectuated at Operator-A bridge 202-2 and Operator-B bridge 202-8, respectively. Beneath the customer-level MIP nodes 206-1 and 206-2 are disposed two MEP nodes 208-1 and 208-2, also effectuated at Operator-A bridge 202-2 and Operator-B bridge 202-8, respectively, that bound the service provider-level OAM domain. Within this domain, a MIP node 210-1 effectuated at Operator-A bridge 202-4 is interfaced with another MIP node 210-2 effectuated at Operator-B bridge 202-5. Two operator-level domains are defined that correspond to the two operator networks, wherein operator-level MEP nodes 212-1 (effectuated at Operator-A bridge 202-2) and 212-2 (effectuated at Operator-A bridge 202-4) bound one operator domain and operator-level MEP nodes 216-1 (effectuated at Operator-B bridge 202-5) and 216-2 (effectuated at Operator-B bridge 202-8) bound the other operator domain. Further, MIP nodes 214-1 through 214-4 are disposed in the operator-level domain defined by the MEP nodes 212-1 and 212-2, wherein bridge 202-2 effectuates MIP node 214-1, bridge 202-3 effectuates MIP nodes 214-2 and 214-3, and bridge 202-4 effectuates MIP node 214-4. Likewise, MIP nodes 218-1 through 218-6 are disposed in the operator-level domain defined by the MEP nodes 216-1 and 216-2, wherein bridge 202-5 effectuates MIP node 218-1, bridge 202-6 effectuates MIP nodes 218-2 and 218-3, bridge 202-7 effectuates MIP nodes 218-4 and 218-5 and, finally, bridge 202-8 effectuates MIP node 218-6.

Figure 3:
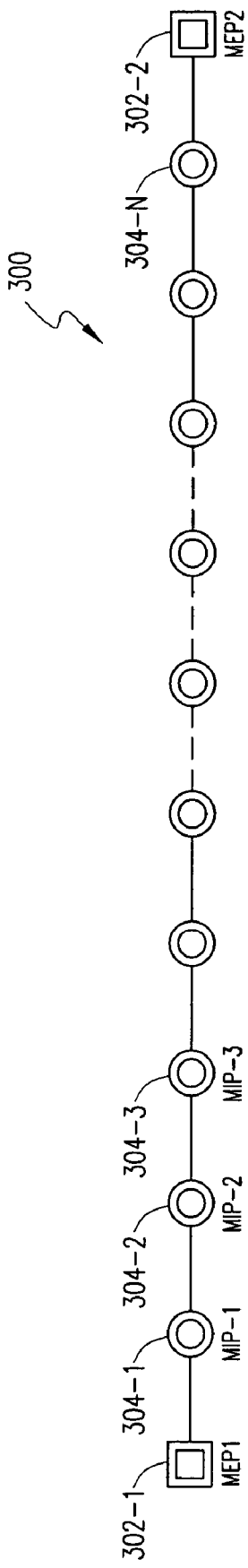
FIG. 3 depicts an exemplary embodiment of an OAM domain bounded by a pair of MEP nodes.

Based on the foregoing discussion, it should be apparent that a single network entity may be operable to effectuate one or more MIP/MEP nodes at different levels depending on its deployment and OAM service provisioning. By way of illustration, it can be seen that bridge entity 202-2 effectuates the processing and logic of customer-level MIP node 206-1, service provider-level MEP 208-1, operator-level MEP 212-1 as well as operator-level MIP 214-2. Accordingly, the physical equipment of an Ethernet network represents a flat, "vertically-compressed" layer that is logically expandable into a number of hierarchical levels where, at any one level, an OAM domain may be abstracted as a concatenation of a plurality of MIP nodes bounded by multiple MEP nodes. In essence, FIG. 3 depicts such an exemplary embodiment of an OAM domain 300 including MIP nodes 304-1 through 304-N that are bounded by a pair of MEP nodes 302-1 and 302-2, which represents a particular case of point-to-point operation. It will be realized that in the point-to-multipoint case, more than two MEPs are provided to bound an OAM domain (as seen, e.g., in the core network portion 108 of FIG. 1).

As alluded to hereinabove, MEP nodes are operable to originate various OAM frames which may be used for effectuating such OAM service functions as discovery, connectivity verification, latency/loss measurements, delay variation measurements, etcetera, within an end-to-end Ethernet network. In general, the OAM frames are issued on a per-Ethernet Virtual Connection (per-EVC) basis and look like user data frames, but differentiated by using (i) certain predetermined multicast addresses for OAM discovery and (ii) certain predetermined EtherTypes for OAM. Also, because Ethernet as a connectionless transport technology has the property that packets may be sent to different entities within the network that need not or should not receive them (e.g., when the MAC address is not known), domain-based OAM barriers or filters are also encoded therein. Additional details regarding the Ethernet OAM hierarchy and OAM domain levels may be found in the following co-pending commonly assigned U.S. patent application(s): (i) "ALARM INDICATION AND SUPPRESSION (AIS) MECHANISM IN AN ETHERNET OAM NETWORK," application Ser. No. 11/023,784, filed Dec. 28, 2004, in the name(s) of: David Elie-Dit-Cosaque, Kamakshi Sridhar, Maarten Petrus Joseph Vissers and Tony Van Kerckhove; and (ii) "AUTOCONFIGURATION OF ETHERNET OAM POINTS," application Ser. No. 11/020, 898, filed Dec. 22, 2004, in the name(s) of: David Elie-Dit-Cosaque, Kamakshi Sridhar, Maarten Vissers and Tony Van Kerckhove; each of which is incorporated by reference herein.

Figure 4:
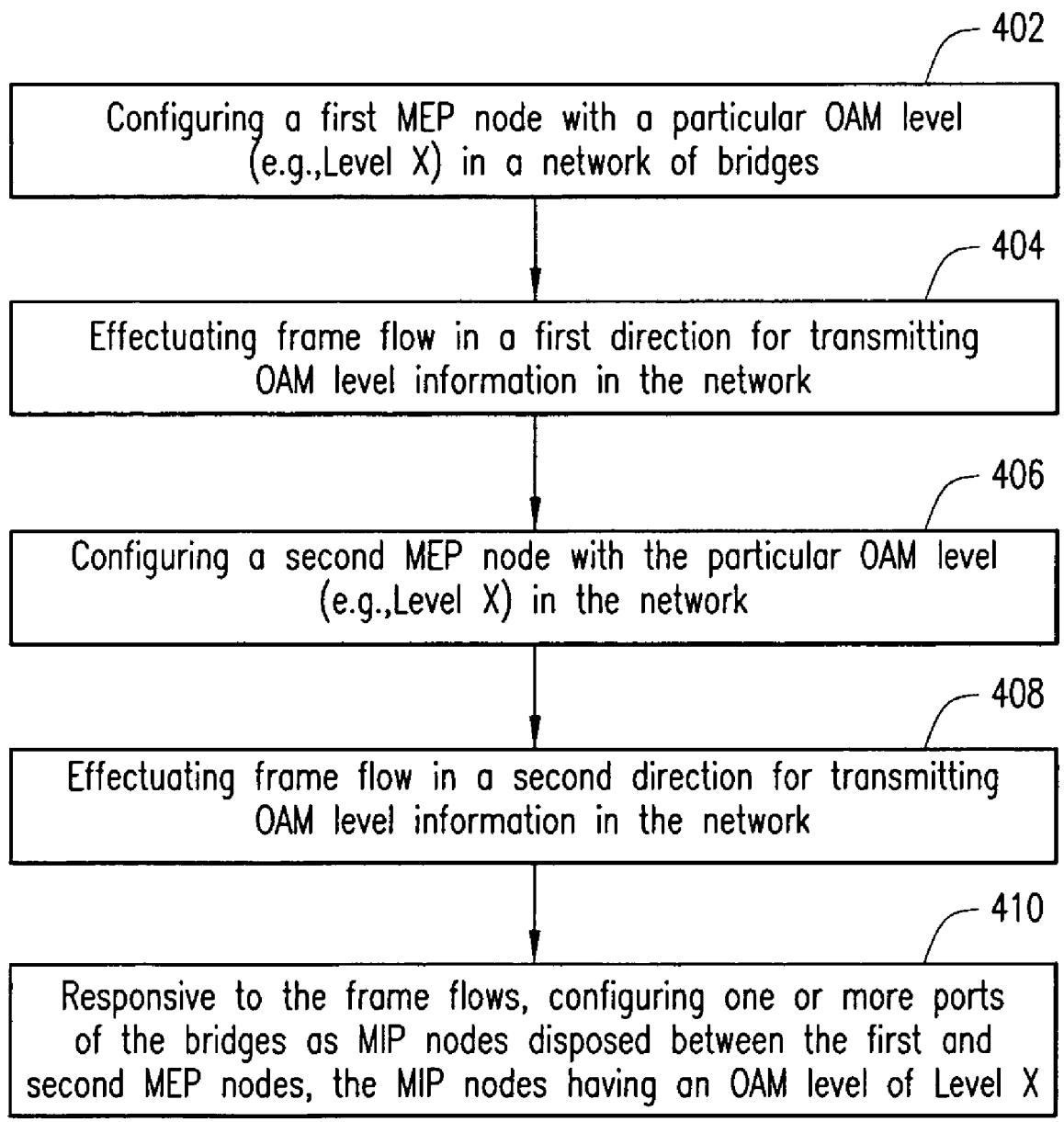
FIG. 4 is a flowchart of a configuration methodology for configuring an OAM domain in a multi-level Ethernet network in accordance with one embodiment of the present invention.

FIG. 4 is a flowchart of a generalized configuration methodology for configuring an OAM domain in a multi-level Ethernet network having a plurality of bridge entities in accordance with one embodiment of the present invention. At block 402, a first MEP node is configured at a port of an end bridge of the network, wherein the first MEP node is preferably manually configured by a network administrator as belonging to a predetermined OAM domain having a particular level (e.g., a customer-level domain, a provider-level domain, or an operator-level domain, etcetera). Frame flow is effectuated in a first direction (e.g., from the first MEP node) for transmitting OAM level information in the network (block 404). A second MEP node with the particular level is then configured at a port belonging to a second end bridge of the network (block 406). Frame flow is effectuated again in a second direction (e.g., from the second MEP node) for transmitting OAM level information in the network (block 408). Responsive to the frame flows, one or more ports of the intermediate bridges are automatically configured as MIP nodes disposed between the first and second MEP nodes, wherein the MIP nodes are assigned an OAM level based on the level information carried in the bi-directional frame flows (block 410). In accordance with the teachings of the present invention, frames operable to carry OAM level information for purposes of domain configuration may comprise either Generic Attribute Registration Protocol (GARP) frames (thereby requiring the functionality of a GARP state machine engine at the bridges) or CC frames including a separate OAM level field. Additionally, the MEP nodes may be configured together before commencing frame flows in either direction for transmitting OAM level information. These embodiments will be now set forth in greater detail hereinbelow.

As is well known, GARP provides a generic attribute dissemination capability whereby devices in a bridged network, i.e., end stations and bridges (or, synonymously, switches), can register and de-register attribute values with one another. In doing so, the attributes are propagated to devices in the network such that the registered devices form a reachability tree that is a subset of an active topology. GARP, which forms a part of the IEEE 802.1p extension to its 802.1d (Spanning Tree) specification, defines the architecture, rules of operation, state machines and variables for the registration and de-registration of attribute values. In general, a GARP participant in a bridge consists of a GARP application component and a GARP Information Declaration (GID) component associated with each port of the bridge.

The propagation of information between GARP participants for the same application in a bridge is carried out by the GARP Information Propagation (GIP) component. Protocol exchanges take place between GARP participants by means of Logical Link Control (LLC) Type 1 services, using the group MAC address and protocol data unit (PDU) formats defined for the GARP application concerned.

In accordance with the teachings of the present invention, OAM level information is provided as an attribute value for propagation in an Ethernet OAM network for purposes of domain configuration. In the context of the present disclosure, domain configuration preferably involves the following: (i) automatic configuration of intermediate OAM flow points (i.e., attribution of a particular OAM level to a domain's MIP nodes); (ii) placement of MIPs at correct locations in the network; and (iii) placement of what are known as Automatic MEP nodes or A-MEP nodes at the domain boundary to prevent frame leakage.

Figure 5:
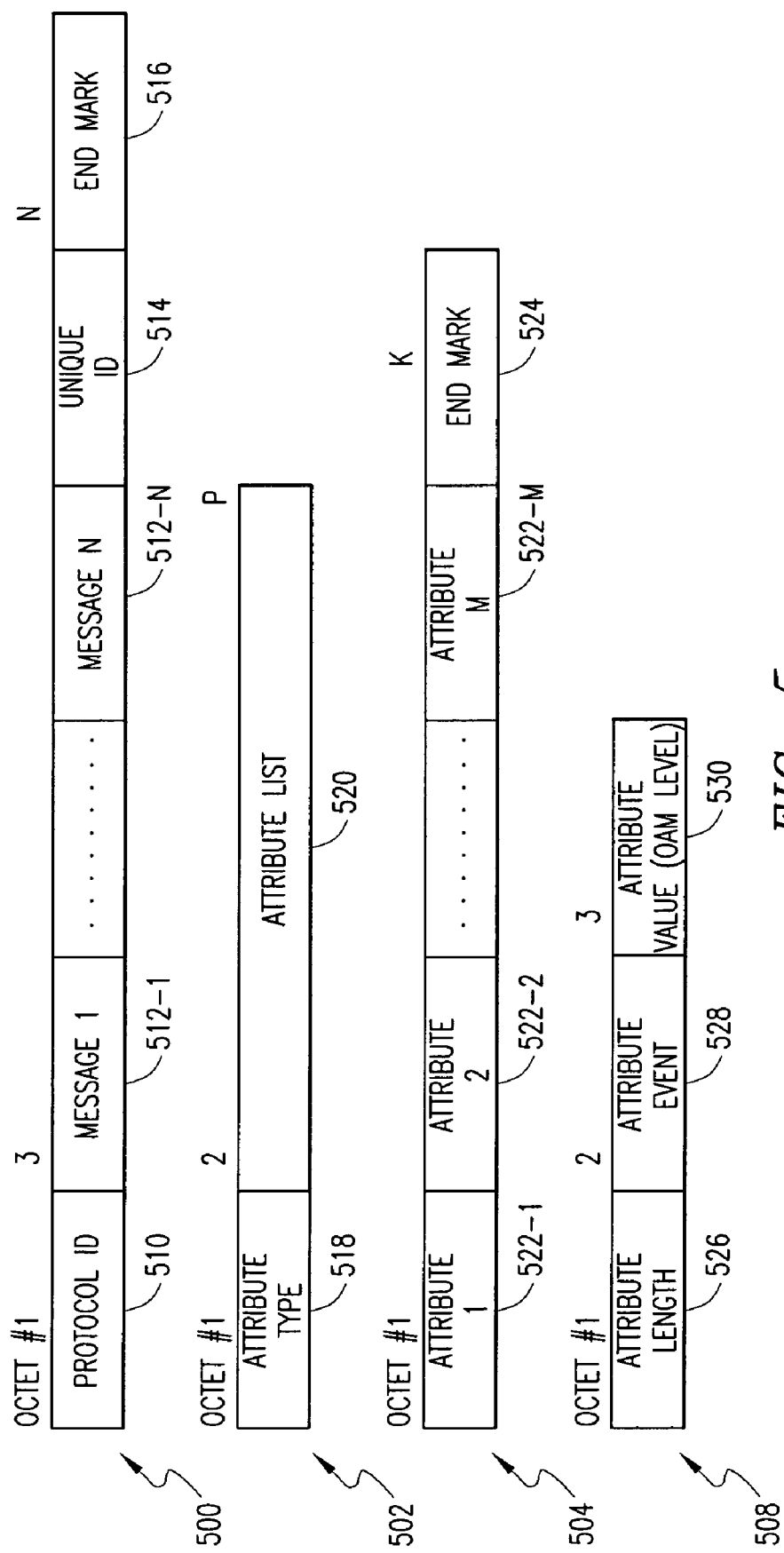
FIG. 5 depicts an exemplary GARP frame structure for use in the domain configuration scheme of the present invention according one embodiment.

FIG. 5 depicts an exemplary GARP frame structure for use in the domain configuration scheme of the present invention according to one embodiment. Reference numeral 500 refers to a GARP PDU frame having N octets for carrying a plurality of messages 512-1 through 512-N. A 2-byte Protocol ID 510 identifies the GARP protocol. An End Mark field 516 is provided as a boundary of the GARP PDU frame 500. In one implementation, a unique ID field 514 is provided for differentiating between frames from two different domains in order to prevent potential failures caused by a failing boundary MEP. As is well known, if a boundary MEP in any domain fails, such a failure renders the network potentially vulnerable to security breaches (due to frame leakage). For example, at a Network-to-Network Interface (NNI) between two operators, if the MEP nodes bounding the two different operators fail, GARP frames may flow across the boundary, and if the operators have the same level, then the two separate operator domains are erroneously merged to form a single domain without raising an alarm to the network management system. Accordingly, the unique ID field 514, which is similar to the 32-bit UUCSIID identifier in the 802.1ag CC frames, operates to uniquely identify a globally-recognized Service Instance, thereby providing a reliable means of determining whether a GARP frame originated inside an operator domain or outside. If the frames are externally generated, the Unique ID value 514 in such frames will not match the value associated with the operator, which causes the external frames to be discarded. An alarm can eventually be propagated to the network management to indicate leakage in the domain.

Continuing to refer to FIG. 5, reference numeral 502 refers to an individual message structure having a plurality of octets, with a 1-byte Attribute Type 518 and an Attribute List field 520 containing a number of attributes. The Attribute Type 518 is operable to define the attribute, such as a group attribute or a service requirement attribute. An exemplary attribute list structure 504 having K octets is illustrated with M attributes 522-1 through 522-M. Again, an End Mark field 524 may be provided as a boundary of the attribute list structure 504. A 3-octet attribute structure 508 includes an Attribute Length field 526, an Attribute Event field 528 and an Attribute Value field 530. Attribute Length 526 defines the length of the particular attribute. Attribute Event 528 defines a number of GARP operators for effectuating various GARP operations: [0] indicates Leave_All operator (e.g., for de-registering an attribute); [1] indicates Join_Empty operator; [2] indicates Join_In operator (e.g., for registering an attribute); [3] indicates Leave_Empty operator; [4] indicates Leave_In operator; and [5] indicates Empty operator. Attribute Value 530 is comprised of the OAM domain level value with which a particular domain is being configured in an Ethernet network.

Figure 6:
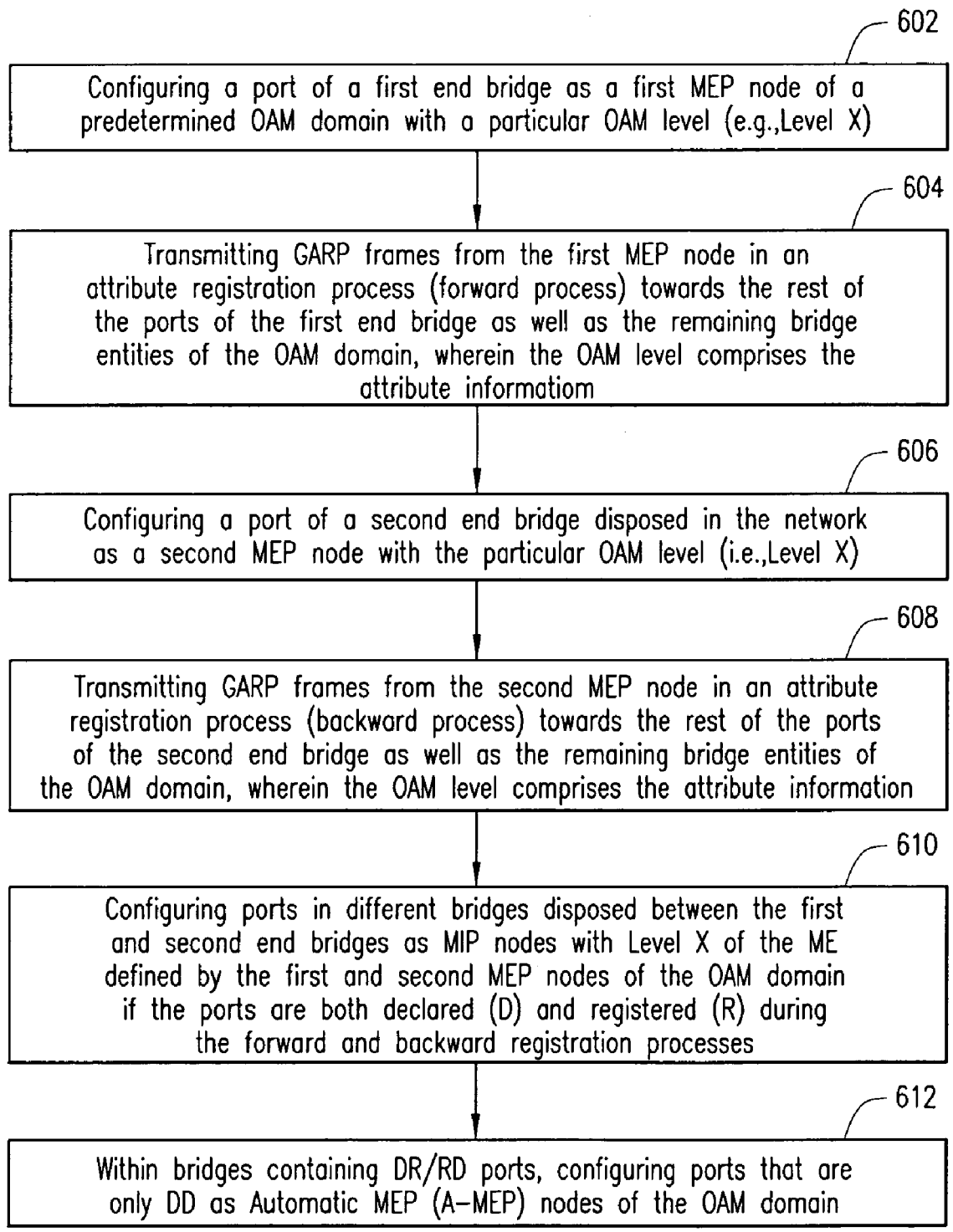
FIG. 6 is a flowchart of an embodiment of a domain configuration method using GARP frames.

Referring now to FIG. 6, shown therein is a flowchart of an embodiment of a domain configuration method using GARP frames. Essentially, the general scheme includes implementing GARP in an OAM configuration application for defining the coverage and boundaries of a predetermined OAM domain and assigning a particular OAM level to the nodes covered in the domain. The following conditions are exemplary implementation concerns in a typical domain configuration scenario:

Two types of flow points that require configuration: MIPs and MEPs.

A single authority (i.e., a network administrator) has the knowledge as to where the edges of a particular domain are to be located. The ports identified as edge ports are to be configured as MEP nodes.

By way of example, there may be only one administrator at each domain level for configuring MEP nodes at that level. Further, the administrator is operable to manually configure the MEP nodes for a level, i.e., assign a particular OAM level to the MEP nodes as well as determine their MEIDs. There is no need, in general, for interaction among the administrators.

When the administrator activates the MEP functionality at the edge bridges (i.e., bridges having the edge ports), a GARP state machine engine associated therewith is also activated for sending GARP frames as part of an attribute registration process. After the MEP nodes are configured, the intermediary MIP nodes need to be automatically configured.

With the foregoing implementation framework as a backdrop, a GARP-based OAM Registration Protocol which, for purposes of the present patent disclosure, may be referred to as a Generic OAM Registration Protocol (GORP) will now be set forth below. When a port of a first end bridge disposed in a network is configured as a first MEP node with certain level (e.g., Level X) of a predetermined domain (block 602), a GARP state machine engine (SME) associated with the end bridge generates GARP frames for transmission in a forward attribute registration process to the remainder the ports of the end bridge which are declared (D) as nodes having the same OAM level (Level X). Also, a GARP frame carrying the OAM level information is propagated over the physical link from the first end bridge to the next bridge it is coupled to (i.e., over the inter-bridge link). When a port at the next bridge receives the GARP frame carrying the OAM level value over the link, it registers (R) the level value for that port. Thereafter, the GARP state machine logic of the receiving bridge declares (D) the OAM level attribute value on the rest of the ports of the bridge. This process continues until the second end bridge of the domain is reached, whereby the ports of the remaining bridge entities of the domain are either registered (when a GARP frame is received via a physical link) or declared (when a GARP frame is received across a bridge fabric) as part of the forward attribute registration process (block 604). At block 606, a port of the second end bridge is configured (e.g., manually) as a second MEP node belonging to the predetermined OAM domain with the particular OAM level (i.e., Level X). Responsive thereto, another attribute registration process is then commenced from the second MEP node towards the remaining ports of the second end bridge and the remaining bridges of the OAM domain in a backward direction, whereby the ports are either registered (R) or declared (D) again (block 608). The intermediary ports in different bridges disposed between the first and second end bridges are automatically configured as MIP nodes with the particular OAM level (i.e., Level X) of the ME defined by the first and second MEP nodes of the OAM domain if the ports are both declared (D) and registered (R) during the forward and backward attribution processes. In other words, the intermediary ports that are either D and R condition or R and D condition after the execution of the attribute registration processes are configured as MIP nodes with the selected OAM level (block 610). Further, as part of GARP's pruning methodology, certain ports of the domain may be automatically configured as boundary nodes that can filter OAM frames. Accordingly, ports which are only declared in both attribute registration processes (i.e., ports with DD designation) and belong to the bridges having ports with DR/RD designation (i.e., MIP nodes) may be automatically configured as MEPs (i.e., automatic MEPs or A-MEPs) that have a reduced set of capabilities as compared to full-fledged MEP nodes defining an ME (block 612). Whereas an A-MEP node cannot initiate any OAM traffic unlike a full-fledged MEP, its filtering functionality is however operable to prevent OAM frames from entering or leaving the OAM domain.

Figure 7A:
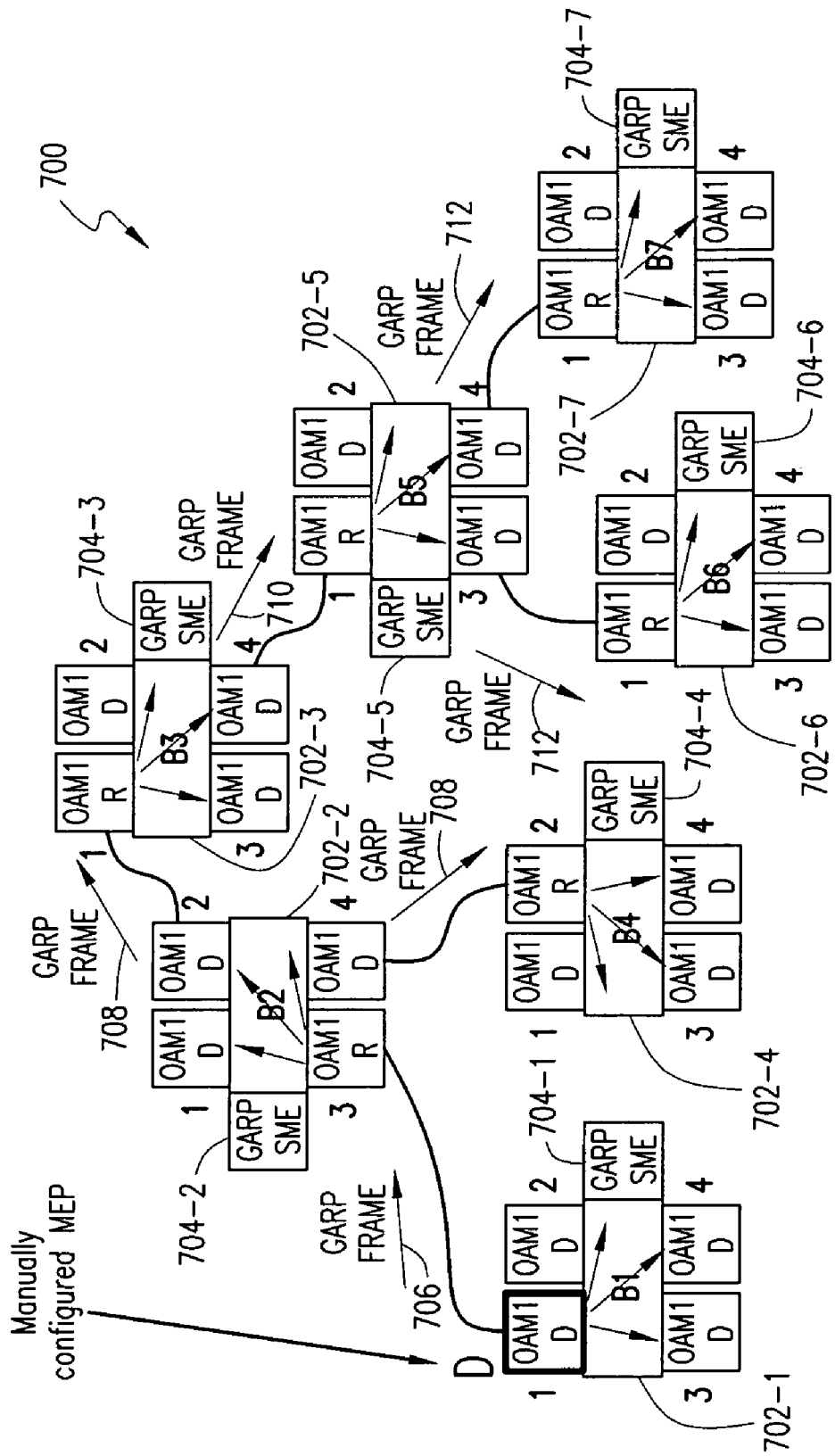
FIGS. 7A and 7B illustrate an embodiment of a GARP-based domain configuration method in an exemplary Ethernet network having a plurality of bridges.
Figure 7B:
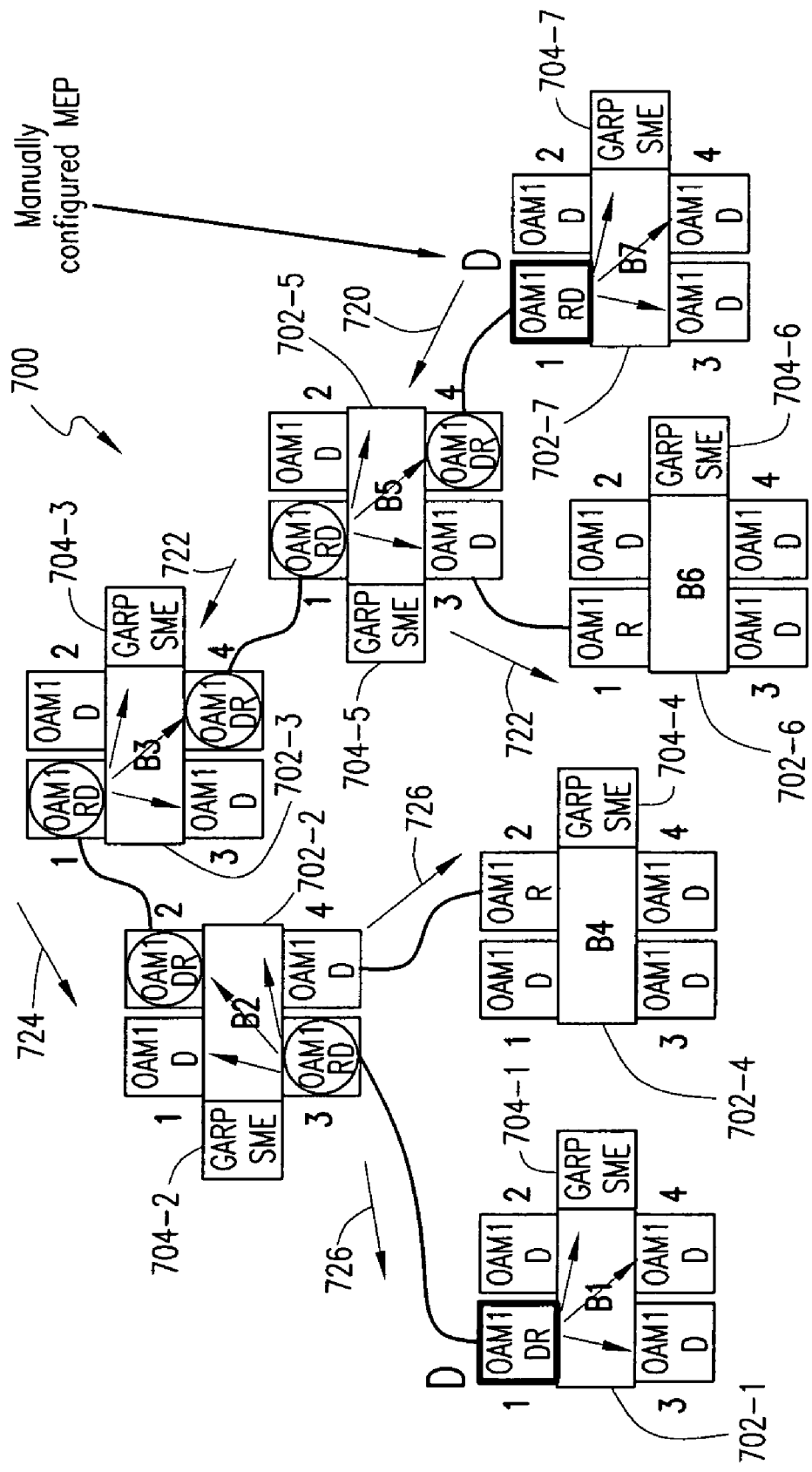

FIGS. 7A and 7B illustrate an embodiment of a GARP-based domain configuration method in an exemplary Ethernet network 700 having a plurality of bridges. Reference numerals 702-1 through 702-7 refer to seven bridges of the network 700 on which a particular domain is to be configured, each bridge having a corresponding GARP state machine 704-i, i=1, 2, . . . , 7. A MEP node is manually configured at Port 1 (i.e., P1) of Bridge 1 (B1) 702-1 as belonging to a predetermined OAM domain having a particular OAM level (e.g., Level 1). Accordingly, P1 of the first end bridge B1 702-1 is declared (D) as a node with Level 1. Responsive thereto, GARP state machine engine 704-1 associated therewith facilitates the transmission of GARP frames 706 that include the OAM level information as an attribute value. In one implementation, such GARP frames may be multicast intermittently across the network. As pointed out earlier, when the GARP frames are received via the bridge fabric, the receiving ports are declared with respect to the attribute value. Accordingly, the remaining ports, i.e., P2 through P4, of Bridge 702-1 are declared (D) as nodes with OAM Level 1. When P3 of Bridge 2 (B2) 702-2 receives the GARP frames 706 over the physical link, it triggers a registration and the port is accordingly registered (R). Thereafter, GARP SME 704-2 associated with Bridge 702-2 facilitates multicast transmission of GARP frames 708 which are propagated to the remaining ports (P1, P2 and P4) and on to the next bridge, i.e., B3 704-3. The attribute registration process is carried out through the remainder of the network 700 in a similar fashion until the end bridge B7 702-7 is reached.

In FIG. 7B, a backward attribute registration process is illustrated that is initiated upon configuring P1 of B7 702-7 (i.e., second end bridge) as a second MEP node of the domain with OAM Level 1. Responsive thereto, another set of GARP frames (exemplified by frames 720, 722, 724 and 726) are cascaded across the network 700 until B1 702-1 is reached by frames 726. Similar to the process described above, each of the ports in the network are either declared (D) or registered (R) in addition to the previous declarations/registrations. Accordingly, after the attribute registration processes are executed, P1 ports of B1 702-1 and B7 702-7 are configured as the two MEP nodes and the remaining ports in the network 700 are in either DR/RD designation or in DD designation. The ports that are both declared and registered (either DR or RD) are automatically configured as MIP nodes of OAM Level 1, which in the network 700 comprise P2 and P3 of B2 702-2, P1 and P4 of B3 702-3, and P1 and P4 of B5 702-5. Further, within the bridges containing DR/RD ports, ports that are only declared in both attribute registration processes (i.e., ports with DD (or, simply D) designation) are configured as A-MEP nodes for OAM Level 1. In the illustrated network 700, A-MEP nodes are therefore configured at P1 and P4 of B2 702-2, P2 and P3 of B3 702-3, and P2 and P3 of B5 702-5. Ports not participating in the configured domain may be de-registered by periodically sending (e.g., every 10-15 seconds) a GARP message with Leave_All attribute event. Such a message is operable to force the ports that do not want their attribute (i.e., OAM level) de-registered to refresh their registration status by sending a GARP frame (Join message). Nodes desirous of de-registering do not send the Join message frames and are thus flushed out of the GARP-defined domain.

Figure 8:
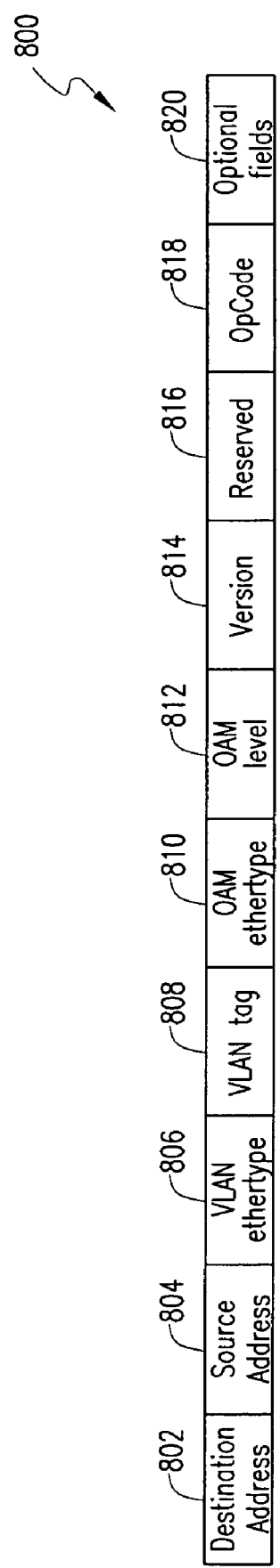
FIG. 8 depicts an exemplary CC frame structure for use in the domain configuration scheme of the present invention according to another embodiment.

FIG. 8 depicts an exemplary CC frame structure 800 for use in an embodiment of the domain configuration scheme of the present invention. A number of fields such as Destination and Source MAC addresses 802 and 804, Virtual LAN (VLAN) EtherType 806, VLAN tag 808, OAM EtherType 810 and an OAM level field 812 are provided along with Version 814 and Reserved 816 fields. Additionally, although not shown in FIG. 8, fields such as Preamble, Postamble, Cyclic Redundancy Check (CRC), UUCSIID identifier field, etcetera, may also be included in the CC frame 800. An opcode 818 and a number of opcode-specific optional Type Length Value (TLV) fields 820 are included in the CC frame 800 for providing additional information. As will be seen in greater detail below, OAM level information in the CC frames may be utilized in a domain configuration scheme similar to the GARP-based GORP scheme set forth hereinabove. Those skilled in the art should recognize that whereas the GORP scheme requires instantiation of a GARP state machine at each of the network bridges, there is no special requirement in a CC-based domain configuration system for additional functionality at the 802.1lag-compliant bridges.

Figure 9:
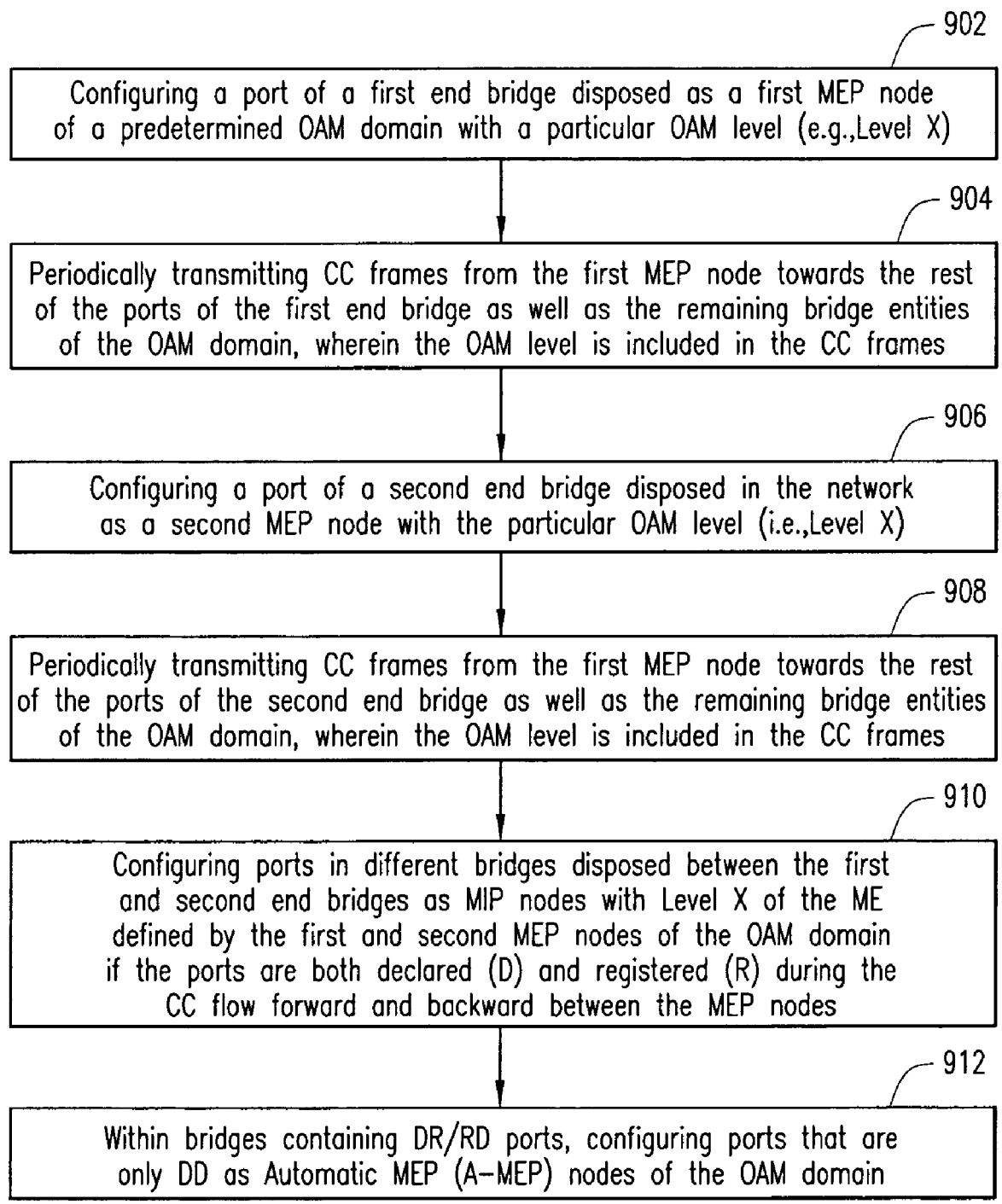
FIG. 9 depicts a flowchart of an embodiment of a domain configuration method using CC frames.

FIG. 9 depicts a flowchart of an embodiment of a domain configuration method using CC frames. Similar to the GORP scheme described previously, a port of a first end bridge is configured by an administrator as a first MEP node of a predetermined OAM domain with a particular level (i.e. Level X) (block 902). The first MEP node thereafter periodically issues CC frames towards the rest of the ports of the first end bridge as well as the remaining bridge entities of the network, wherein the particular OAM level is included in the CC frames (block 904). Analogous to the attribute registration process in GORP, the ports of the network are either declared (D) if the CC frame is received via the bridge fabric or registered (R) if the CC frame is received over a physical link. A port of a second end bridge is then configured as a second MEP node belonging to the OAM domain with the same level (i.e., Level X) (block 906), which commences a backward attribute registration process effectuated by the CC flow generated by the second MEP. Accordingly, CC frames are periodically issued from the second MEP node towards the rest of the ports of the second end bridge and the remaining bridge entities of the network, with the OAM level information being encoded therein (block 908). Responsive thereto, the ports are again either declared or registered such that the intermediary ports are in either DD or RD/DR condition. With the end ports having been configured as two MEP nodes of the domain, ports in different bridges disposed between the two end bridges are automatically configured as MIP nodes having the particular OAM level (Level X), provided that the ports are both declared and registered during the forward and backward CC flow between the MEP nodes (block 910). Again, similar to the GORP scheme set forth previously, ports with either DR or RD designation are accordingly configured as the MIP nodes of the domain. Further, analogous to GARP pruning, ports within bridges containing DR/RD ports may be automatically configured as A-MEP nodes if such ports are only declared during the CC flows (block 912).

Figure 10A:
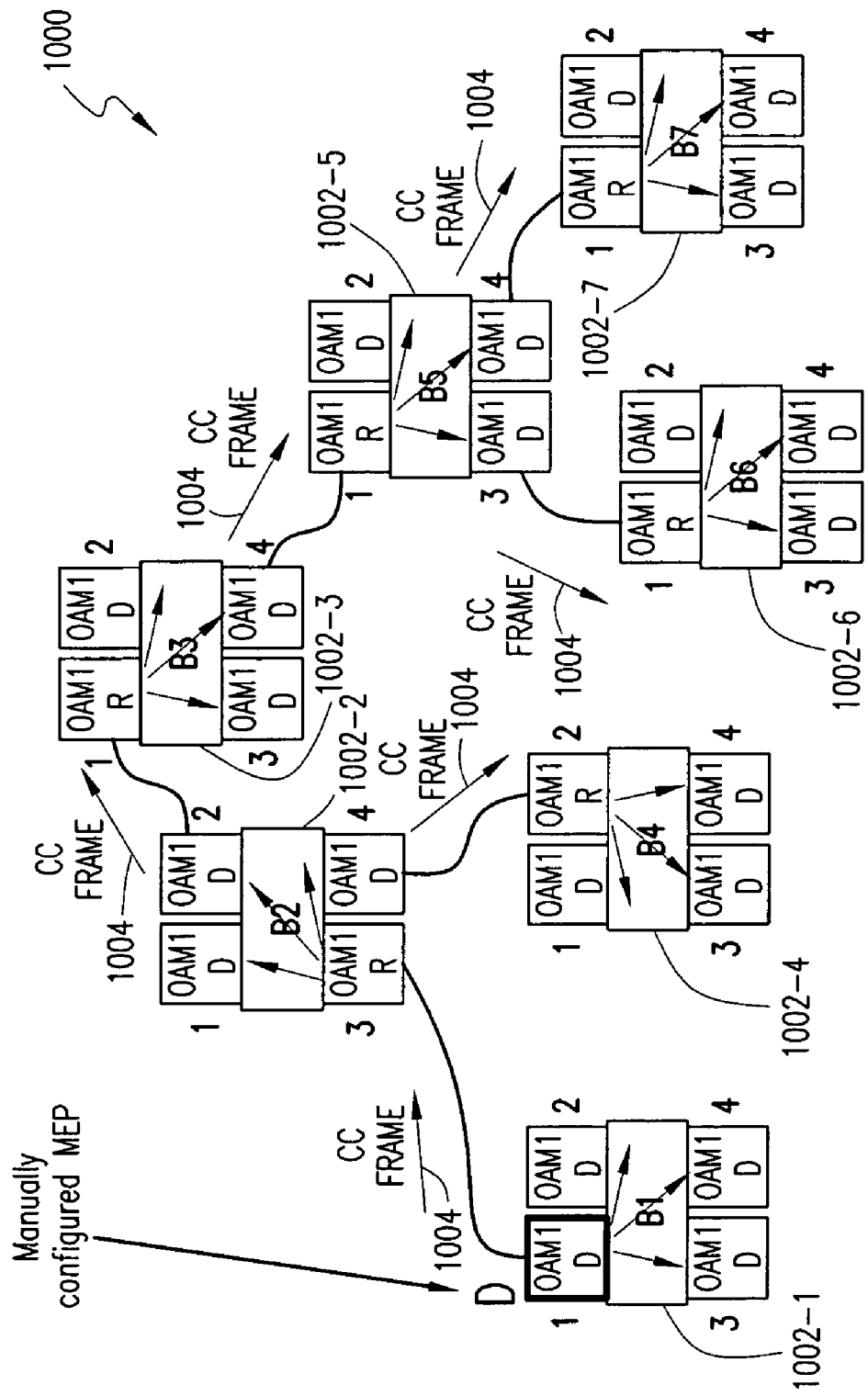
FIGS. 10A and 10B illustrate an embodiment of a CC-based domain configuration method in an exemplary Ethernet network having a plurality of bridges.
Figure 10B:
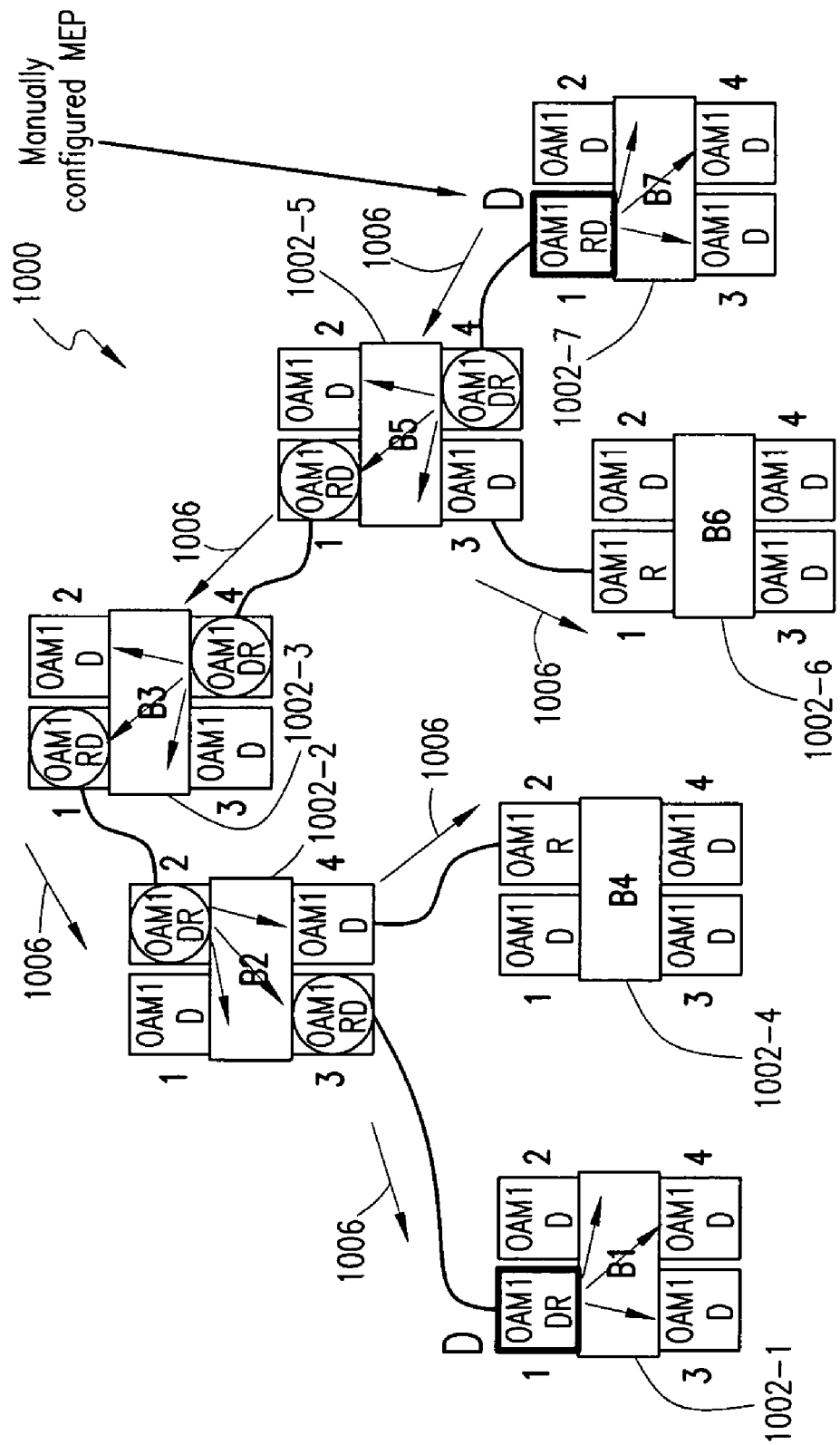

FIGS. 10A and 10B illustrate an embodiment of a CC-based domain configuration method in an exemplary Ethernet network 1000 having a plurality of bridges B1 1002-1 through 1002-7. It should be apparent to those skilled in the art that the CC-based domain configuration scheme is essentially similar to the GORP scheme illustrated in FIGS. 7A and 7B with respect to the network 700. Instead of the GARP frames being issued in the attribute registration processes, a plurality of CC frames, e.g., CC frames 1004 in FIG. 10A for the forward CC flow (i.e., from Bridge B1 1002-1 to Bridge B7 1002-7) and CC frames 1006 in FIG. 10B for the backward CC flow (i.e., from Bridge B7 1002-7 to Bridge B1 1002-1), are provided for propagating the OAM level information. Also, as noted previously, no separate state machine functionality is needed for generating the CC frames. However, it should be realized that in each of the domain configuration embodiments, the designation of forward and backward directions is purely arbitrary and, accordingly, it is irrelevant as to which end bridge is first configured with a MEP node or in which direction the frame flow is initiated first. In any event, upon effectuating attribute registration in both directions, the CC-based configuration scheme provides that P1 ports of B1 1002-1 and B7 1002-7 are configured as the two MEP nodes of the domain being set up in the network 1000 and the remaining ports in the network 1000 are in either DR/RD designation or in DD designation. Analogous to the GORP scheme, the ports that are both declared and registered (either DR or RD) are automatically configured as MIP nodes of OAM Level 1, which in the network 1000 comprise P2 and P3 of B2 1002-2, P1 and P4 of B3 1002-3, and P1 and P4 of B5 1002-5. Further, within the bridges containing DR/RD ports, ports that are only declared in both attribute registration processes (i.e., ports with DD (or, simply D) designation) are configured as A-MEP nodes for OAM Level 1. In the illustrated network 1000, A-MEP nodes are therefore configured at P1 and P4 of B2 1002-2, P2 and P3 of B3 1002-3, and P2 and P3 of B5 1002-5. Similar to the A-MEP nodes configured in a GORP scheme, A-MEP nodes created under the CC-based configuration scheme also have a reduced set of capabilities as compared to full-fledged MEP nodes.

It should be recalled that unlike GARP, CC frames are sent continuously in the network. Hence there is a periodic reinforcement of registration and declaration of the attribute value, i.e., the OAM level value. As a result, CC frame loss is operable to trigger de-registration of the attribute. With respect to the possibility of domain merger at the NNI between two operators should an A-MEP node or MEP node fail at the boundary, the UUCSIID field in the CC frames provides a reliable means of determining whether a CC frame originated within a particular operator or not. Accordingly, an operator receiving a leaked CC frame from a neighboring operator is prevented from processing it as frame of its own.

Figure 11A:
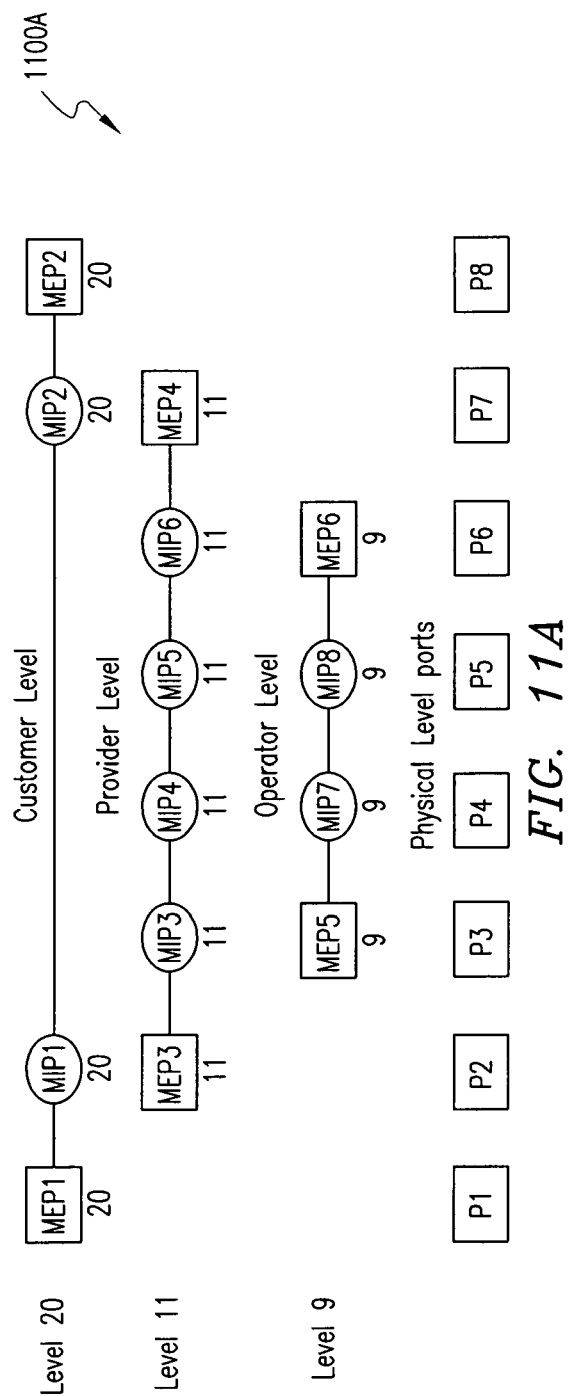
FIGS. 11A and 11B illustrate a level assignment procedure for MIP nodes in a domain configuration scheme of the present invention.
Figure 11B:
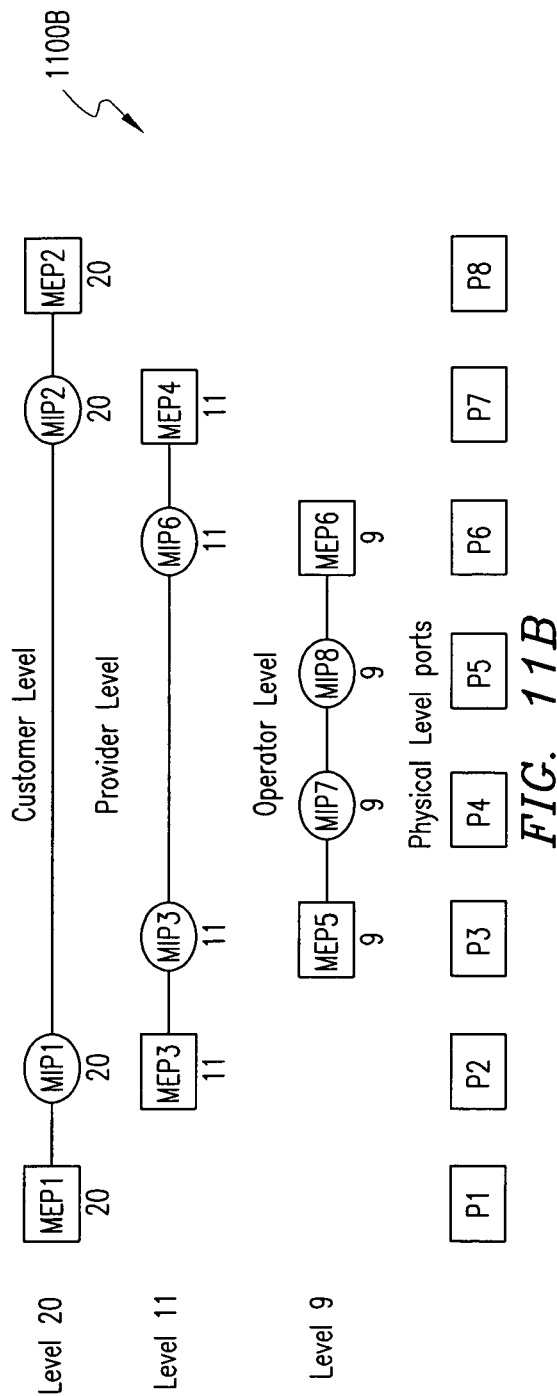

Regardless of whether a CC-based or a GARP-based domain configuration scheme is implemented, it is possible to configure multiple levels on a single port at the same time. If multiple levels are registered on the same port (i.e., MIP nodes with different levels configured at the same port), a mechanism is required to resolve the MIP levels since a MIP node can be active only one level at a time. FIGS. 11A and 11B illustrate a level assignment procedure for MIP nodes in a domain configuration scheme of the present invention. In essence, logic provided with a MIP node is operable to determine the minimum value of the registered levels at the port on which it is configured and select that minimum value as its OAM level. That is, an activated MIP node makes a local decision to determine Min{Level Value(i)}, where i=1, 2, ... , K, which becomes its OAM level in the Ethernet domain hierarchy. By way of illustration, reference numeral 1100A in FIG. 11A generally refers to a three-level domain hierarchy configured on an eight-port network system, wherein a customer-level domain including MEP1, MEP2, MIP1 and MIP 2 is assigned Level 20, a provider-level domain including MEP3, MEP4, MIP3, MIP4, MIP5 and MIP6 is assigned Level 11, and an operator-level domain including MEP5, MEP6, MIP7 and MIP8 is assigned Level 9. Each level is configured one at a time and the order in which the levels are configured does not matter for purposes of the domain configuration schemes of the present invention. As can be seen from FIG. 11A, each of P4 and P5 ports is configured with two MIP nodes, one at Level 11 and one at Level 9, resulting in four MIP nodes in total: MIP4 and MIP7 at P4 and MIP5 and MIP8 at P5. In accordance with the teachings of the present disclosure, lower level attribute registration triggers changes of level at P4 and P5, whereby the MIP nodes configured on P4 and P5 are activated at Min{11, 9}, i.e., Level 9. The resulting hierarchy is shown generally at reference numeral 1100B in FIG. 11B.

Based on the foregoing Detailed Description, it should be appreciated that the present invention advantageously provides a domain configuration mechanism operable in an Ethernet OAM network wherein the MIP nodes are configured automatically rather than by way of manual configuration. Thus, the possibility of mistakes due to manual misconfiguration is significantly reduced, especially in OAM domains provisioned with a large number of MIP nodes. Moreover, security violations due to leakage of frames from one domain to another are reduced because of the provisioning of A-MEP nodes at appropriate locations in the network.

Although the invention has been described with reference to certain exemplary embodiments, it is to be understood that the forms of the invention shown and described are to be treated as exemplary embodiments only. Accordingly, various changes, substitutions and modifications can be realized without departing from the spirit and scope of the invention as defined by the appended claims.

What is claimed is:

1. A domain configuration method operable in an Ethernet network having multiple levels of Operations, Administration and Maintenance (OAM) domains, comprising:
   configuring a port of a first end bridge in said Ethernet network as a first Maintenance End Point (MEP) node belonging to a predetermined OAM domain having a particular level;

transmitting a first set of frames from said first MEP node towards remaining ports of said first end bridge and remaining bridges of said Ethernet network, said first set of frames including level information relating to said particular level;

configuring a port of a second end bridge in said Ethernet network as a second Maintenance End Point (MEP) node belonging to said predetermined OAM domain having said particular level;

transmitting a second set of frames from said second MEP node towards remaining ports of said second end bridge and remaining bridges of said Ethernet network, said second set of frames including level information relating to said particular level; and responsive to said first and second set of frames, configuring ports in bridges disposed between said first and second end bridges as Maintenance Intermediate Point (MIP) nodes having said particular level.

2. The domain configuration method operable in an Ethernet network having multiple OAM domains as recited in claim 1, wherein said predetermined OAM domain comprises a customer-level OAM domain.

3. The domain configuration method operable in an Ethernet network having multiple OAM domains as recited in claim 1, wherein said predetermined OAM domain comprises a provider-level OAM domain.

4. The domain configuration method operable in an Ethernet network having multiple OAM domains as recited in claim 1, wherein said predetermined OAM domain comprises an operator-level OAM domain.

5. The domain configuration method operable in an Ethernet network having multiple OAM domains as recited in claim 1, wherein said port of said first end bridge is manually configured as said first MEP node.

6. The domain configuration method operable in an Ethernet network having multiple OAM domains as recited in claim 1, wherein said port of said second end bridge is manually configured as said second MEP node.

7. The domain configuration method operable in an Ethernet network having multiple OAM domains as recited in claim 1, wherein said ports in said bridges disposed between said first and second end bridges are automatically configured as MIP nodes having said particular level.

8. The domain configuration method operable in an Ethernet network having multiple OAM domains as recited in claim 1, wherein said first and second set of frames comprise Continuity Check (CC) frames, with said level information populating an OAM level field in said CC frames.

9. The domain configuration method operable in an Ethernet network having multiple OAM domains as recited in claim 1, wherein said first and second set of frames comprise Generic Attribute Registration Protocol (GARP) frames, with said level information populating an attribute value field in said GARP frames.

10. The domain configuration method operable in an Ethernet network having multiple OAM domains as recited in claim 1, further comprising:

determining if at least one of said ports configured as MIP nodes belongs to multiple levels; and if so, assigning a level to said at least one of said ports that comprises a minimum value of said multiple levels.

11. The domain configuration method operable in an Ethernet network having multiple OAM domains as recited in claim 1, further comprise automatically configuring at least one port at an intermediate bridge disposed between said first and second end bridges as an Automatic MEP (A-MEP) node with respect to said predetermined OAM domain.

12. A domain configuration system operable in an Ethernet network having multiple levels of Operations, Administration and Maintenance (OAM) domains, comprising:

means for configuring a port of a first end bridge in said Ethernet network as a first Maintenance End Point (MEP) node belonging to a predetermined OAM domain having a particular level;

means for generating a first set of frames from said first MEP node for transmission towards remaining ports of said first end bridge and remaining bridges of said Ethernet network, said first set of frames including level information relating to said particular level;

means for configuring a port of a second end bridge in said Ethernet network as a second Maintenance End Point (MEP) node belonging to said predetermined OAM domain having said particular level;

means for generating a second set of frames from said second MEP node for transmission towards remaining ports of said second end bridge and remaining bridges of said Ethernet network, said second set of frames including level information relating to said particular level; and means, operable responsive to said first and second set of frames, for configuring ports in bridges disposed between said first and second end bridges as Maintenance Intermediate Point (MIP) nodes having said particular level.

13. The domain configuration system operable in an Ethernet network having multiple OAM domains as recited in claim 12, wherein said predetermined OAM domain comprises a customer-level OAM domain.

14. The domain configuration system operable in an Ethernet network having multiple OAM domains as recited in claim 12, wherein said predetermined OAM domain comprises a provider-level OAM domain.

15. The domain configuration system operable in an Ethernet network having multiple OAM domains as recited in claim 12, wherein said predetermined OAM domain comprises an operator-level OAM domain.

16. The domain configuration system operable in an Ethernet network having multiple OAM domains as recited in claim 12, wherein said means for configuring said port of said first end bridge includes means for manually configuring said port of said first end bridge as said first MEP node.

17. The domain configuration system operable in an Ethernet network having multiple OAM domains as recited in claim 12, wherein said means for configuring said port of said second end bridge includes means for manually configuring said port of said second end bridge as said second MEP node.

18. The domain configuration system operable in an Ethernet network having multiple OAM domains as recited in claim 12, wherein said means for configuring said ports in said bridges disposed between said first and second end bridges includes means for automatically configuring said ports as MIP nodes having said particular level.

19. The domain configuration system operable in an Ethernet network having multiple OAM domains as recited in claim 12, wherein said means for generating said first and second set of frames comprise means for generating Continuity Check (CC) frames, with said level information populating an OAM level field in said CC frames.

20. The domain configuration system operable in an Ethernet network having multiple OAM domains as recited in claim 12, wherein said means for generating said first and second set of frames comprise means for generating Generic Attribute Registration Protocol (GARP) frames, with said level information populating an attribute value field in said GARP frames.

21. The domain configuration system operable in an Ethernet network having multiple OAM domains as recited in claim 12, further comprising:
  means for determining if at least one of said ports configured as MIP nodes belongs to multiple levels; and
  means, operable to said determination, for assigning a level to said at least one of said ports that comprises a minimum value of said multiple levels.

22. The domain configuration system operable in an Ethernet network having multiple OAM domains as recited in claim 12, further comprising means for automatically configuring at least one port at an intermediate bridge disposed between said first and second end bridges as an Automatic MEP (A-MEP) node with respect to said predetermined OAM domain.

23. A domain configuration method operable in an Ethernet network having multiple levels of Operations, Administration and Maintenance (OAM) domains, comprising:
  manually configuring a port of a first end bridge in said Ethernet network as a first Maintenance End Point (MEP) node belonging to a predetermined OAM domain having a particular level;
  transmitting a first set of Generic Attribute Registration Protocol (GARP) frames in a forward attribute registration process from said first MEP node towards remaining ports of said first end bridge and remaining bridges of said Ethernet network, said first set of GARP frames including level information relating to said particular level as an attribute value therein;
  manually configuring a port of a second end bridge in said Ethernet network as a second Maintenance End Point (MEP) node belonging to said predetermined OAM domain having said particular level;
  transmitting a second set of GARP frames in a backward attribute registration process from said second MEP node towards remaining ports of said second end bridge and remaining bridges of said Ethernet network, said second set of GARP frames including level information relating to said particular level as an attribute value therein; and
  responsive to said first and second set of GARP frames, automatically configuring ports in bridges disposed between said first and second end bridges as Maintenance Intermediate Point (MIP) nodes having said particular level.

24. The domain configuration method operable in an Ethernet network having multiple OAM domains as recited in claim 23, wherein said predetermined OAM domain comprises a domain selected from the group consisting of a customer-level OAM domain, a provider-level OAM domain and an operator-level OAM domain.

25. The domain configuration method operable in an Ethernet network having multiple OAM domains as recited in claim 23, wherein a port receiving a GARP frame in either of said forward and backward attribute registration processes over an inter-bridge link is registered as a node having said particular level.

26. The domain configuration method operable in an Ethernet network having multiple OAM domains as recited in claim 25, wherein a port receiving a GARP frame in either of said forward and backward attribute registration processes over a bridge fabric is declared as a node having said particular level.

27. The domain configuration method operable in an Ethernet network having multiple OAM domains as recited in claim 26, wherein a port that is both declared and registered as a node having said particular level is automatically configured as a MIP node having said particular level.

28. The domain configuration method operable in an Ethernet network having multiple OAM domains as recited in claim 27, wherein a port that is declared in both of said forward and backward attribute registration processes as a node having said particular level is automatically configured as an Automatic MEP (A-MEP) node with respect to said particular OAM domain.

29. The domain configuration method operable in an Ethernet network having multiple OAM domains as recited in claim 28, further comprising:
  determining if at least one of said ports configured as MIP nodes belongs to multiple levels; and
  if so, assigning a level to said at least one of said ports that comprises a minimum value of said multiple levels.

30. A domain configuration system operable in an Ethernet network having multiple levels of Operations, Administration and Maintenance (OAM) domains, comprising:
  means for manually configuring a port of a first end bridge in said Ethernet network as a first Maintenance End Point (MEP) node belonging to a predetermined OAM domain having a particular level;
  means for generating a first set of Generic Attribute Registration Protocol (GARP) frames for transmission in a forward attribute registration process from said first MEP node towards remaining ports of said first end bridge and remaining bridges of said Ethernet network, said first set of GARP frames including level information relating to said particular level as an attribute value therein;
  means for manually configuring a port of a second end bridge in said Ethernet network as a second Maintenance End Point (MEP) node belonging to said predetermined OAM domain having said particular level;
  means for generating a second set of GARP frames for transmission in a backward attribute registration process from said second MEP node towards remaining ports of said second end bridge and remaining bridges of said Ethernet network, said second set of GARP frames including level information relating to said particular level as an attribute value therein; and
  means, operable responsive to said first and second set of GARP frames, for automatically configuring ports in bridges disposed between said first and second end bridges as Maintenance Intermediate Point (MIP) nodes having said particular level.

31. The domain configuration system operable in an Ethernet network having multiple OAM domains as recited in claim 30, wherein said predetermined OAM domain comprises a domain selected from the group consisting of a customer-level OAM domain, a provider-level OAM domain and an operator-level OAM domain.

32. The domain configuration system operable in an Ethernet network having multiple OAM domains as recited in claim 30, wherein a port receiving a GARP frame in either of said forward and backward attribute registration processes over an inter-bridge link is registered as a node having said particular level.

33. The domain configuration system operable in an Ethernet network having multiple OAM domains as recited in claim 32, wherein a port receiving a GARP frame in either of said forward and backward attribute registration processes over a bridge fabric is declared as a node having said particular level.

34. The domain configuration system operable in an Ethernet network having multiple OAM domains as recited in claim 33, wherein a port that is both declared and registered as a node having said particular level is automatically configured as a MIP node having said particular level.

35. The domain configuration system operable in an Ethernet network having multiple OAM domains as recited in claim 34, wherein a port that is declared in both of said forward and backward attribute registration processes as a node having said particular level is automatically configured as an Automatic MEP (A-MEP) node with respect to said particular OAM domain.

36. The domain configuration system operable in an Ethernet network having multiple OAM domains as recited in claim 28, further comprising:
  means for determining if at least one of said ports configured as MIP nodes belongs to multiple levels; and
  means, operable responsive to said determination, for assigning a level to said at least one of said ports that comprises a minimum value of said multiple levels.

37. A domain configuration method operable in an Ethernet network having multiple levels of Operations, Administration and Maintenance (OAM) domains, comprising:
  manually configuring a port of a first end bridge in said Ethernet network as a first Maintenance End Point (MEP) node belonging to a predetermined OAM domain having a particular level;
  periodically transmitting a first set of Continuity Check (CC) frames in a forward attribute registration process from said first MEP node towards remaining ports of said first end bridge and remaining bridges of said Ethernet network, said first set of CC frames including level information relating to said particular level in an OAM level field therein;
  manually configuring a port of a second end bridge in said Ethernet network as a second Maintenance End Point (MEP) node belonging to said predetermined OAM domain having said particular level;
  transmitting a second set of CC frames in a backward attribute registration process from said second MEP node towards remaining ports of said second end bridge and remaining bridges of said Ethernet network, said second set of CC frames including level information relating to said particular level as an attribute value therein; and
  responsive to said first and second set of CC frames, automatically configuring ports in bridges disposed between said first and second end bridges as Maintenance Intermediate Point (MIP) nodes having said particular level.

38. The domain configuration method operable in an Ethernet network having multiple OAM domains as recited in claim 37, wherein said predetermined OAM domain comprises a domain selected from the group consisting of a customer-level OAM domain, a provider-level OAM domain and an operator-level OAM domain.

39. The domain configuration method operable in an Ethernet network having multiple OAM domains as recited in claim 37, wherein a port receiving a CC frame in either of said forward and backward attribute registration processes over an inter-bridge link is registered as a node having said particular level.

40. The domain configuration method operable in an Ethernet network having multiple OAM domains as recited in claim 39, wherein a port receiving a CC frame in either of said forward and backward attribute registration processes over a bridge fabric is declared as a node having said particular level.

41. The domain configuration method operable in an Ethernet network having multiple OAM domains as recited in claim 40, wherein a port that is both declared and registered as a node having said particular level is automatically configured as a MIP node having said particular level.

42. The domain configuration method operable in an Ethernet network having multiple OAM domains as recited in claim 41, wherein a port that is declared in both of said forward and backward attribute registration processes as a node having said particular level is automatically configured as an Automatic MEP (A-MEP) node with respect to said particular OAM domain.

43. The domain configuration method operable in an Ethernet network having multiple OAM domains as recited in claim 42, further comprising:
  determining if at least one of said ports configured as MIP nodes belongs to multiple levels; and
  if so, assigning a level to said at least one of said ports that comprises a minimum value of said multiple levels.

44. A domain configuration system operable in an Ethernet network having multiple levels of Operations, Administration and Maintenance (OAM) domains, comprising:
  means for manually configuring a port of a first end bridge in said Ethernet network as a first Maintenance End Point (MEP) node belonging to a predetermined OAM domain having a particular level;
  means for generating a first set of Continuity Check (CC) frames for transmission in a forward attribute registration process from said first MEP node towards remaining ports of said first end bridge and remaining bridges of said Ethernet network, said first set of CC frames including level information relating to said particular level in an OAM level field therein;
  means for manually configuring a port of a second end bridge in said Ethernet network as a second Maintenance End Point (MEP) node belonging to said predetermined OAM domain having said particular level;
  means for generating a second set of CC frames for transmission in a backward attribute registration process from said second MEP node towards remaining ports of said second end bridge and remaining bridges of said Ethernet network, said second set of CC frames including level information relating to said particular level as an attribute value therein; and
  means, operable responsive to said first and second set of CC frames, for automatically configuring ports in bridges disposed between said first and second end bridges as Maintenance Intermediate Point (MIP) nodes having said particular level.

45. The domain configuration system operable in an Ethernet network having multiple OAM domains as recited in claim 44, wherein said predetermined OAM domain comprises a domain selected from the group consisting of a customer-level OAM domain, a provider-level OAM domain and an operator-level OAM domain.

46. The domain configuration system operable in an Ethernet network having multiple OAM domains as recited in claim 44, wherein a port receiving a CC frame in either of said forward and backward attribute registration processes over an inter-bridge link is registered as a node having said particular level.

47. The domain configuration system operable in an Ethernet network having multiple OAM domains as recited in claim 46, wherein a port receiving a CC frame in either of said forward and backward attribute registration processes over a bridge fabric is declared as a node having said particular level.

48. The domain configuration system operable in an Ethernet network having multiple OAM domains as recited in claim 47, wherein a port that is both declared and registered as a node having said particular level is automatically configured as a MIP node having said particular level.

49. The domain configuration system operable in an Ethernet network having multiple OAM domains as recited in claim 48, wherein a port that is declared in both of said forward and backward attribute registration processes as a node having said particular level is automatically configured as an Automatic MEP (A-MEP) node with respect to said particular OAM domain.

50. The domain configuration system operable in an Ethernet network having multiple OAM domains as recited in claim 49, further comprising:
  means for determining if at least one of said ports configured as MIP nodes belongs to multiple levels; and
  means, operable responsive to said determination, for assigning a level to said at least one of said ports that comprises a minimum value of said multiple levels.

\* \* \* \* \*